(12) United States Patent
Luk

(10) Patent No.: US 9,976,630 B2
(45) Date of Patent: May 22, 2018

(54) SMART GEARING SYSTEM FOR BICYCLE

(71) Applicant: Kim Leung Luk, Hong Kong (HK)

(72) Inventor: Kim Leung Luk, Hong Kong (HK)

(*) Notice: Subject to any disclaimer, the term of this patent is extended or adjusted under 35 U.S.C. 154(b) by 0 days. days.

(21) Appl. No.: 15/599,507

(22) Filed: May 19, 2017

(65) Prior Publication Data
US 2017/0335928 A1  Nov. 23, 2017

Related U.S. Application Data

(60) Provisional application No. 62/339,104, filed on May 20, 2016.

(51) Int. Cl.
B62M 9/06 (2006.01)
F16H 3/50 (2006.01)
B62M 11/00 (2006.01)
B62M 11/14 (2006.01)
F16H 59/00 (2006.01)

(52) U.S. Cl.
CPC .............. F16H 3/50 (2013.01); B62M 9/06 (2013.01); B62M 11/00 (2013.01); B62M 11/14 (2013.01); B62M 2701/0046 (2013.01); F16H 59/00 (2013.01)

(58) Field of Classification Search
CPC ........ B62M 9/06; B62M 11/14; B62M 11/18; B62M 2701/0046; F16H 3/725
See application file for complete search history.

(56) References Cited

U.S. PATENT DOCUMENTS

2013/0284527 A1* 10/2013 Murakami ............... B60L 7/18
                                                        180/55
2014/0221151 A1*  8/2014 Nino .................... B62M 6/55
                                                        477/5
2016/0362158 A1* 12/2016 Storti ................... B62M 6/50
2017/0152002 A1*  6/2017 Yamamoto ............. B62M 6/55

FOREIGN PATENT DOCUMENTS

TW             331284 U      5/1998

* cited by examiner

Primary Examiner — Huan Le

(57) ABSTRACT

A bicycle gearing system includes input and output shafts, two planetary gear systems, and a clutch mechanism. The clutch mechanism includes three clutch presser plates for frictional engagement with two clutch disks and a clutch base. A motor rotates a camshaft formed with cams selectively engageable with cam followers for driving the clutch presser plates to rotate. Steels balls are provided within cavities formed between the clutch presser plates and a clutch housing to convert rotation of clutch presser plates to linear force for frictional engagement with the two clutch disks and the clutch base. Different angles of rotation of the camshaft produce different clutch and gear combinations and different gear ratios.

19 Claims, 20 Drawing Sheets

US 9,976,630 B2

SMART GEARING SYSTEM FOR BICYCLE

CROSS-REFERENCE TO RELATED APPLICATIONS

This application claims the benefit of U.S. Provisional Patent Application No. 62/339,104, filed May 20, 2016, the entire content of which is hereby incorporated by reference.

FIELD OF THE TECHNOLOGY

The present application relates to the field of smart bicycle gearing system. More specifically, the application relates to smart technology with automatic gearing mechanism which optionally replaces the conventional sprocket gearing system for any kind of bicycle.

DESCRIPTION OF THE RELATED ART

A shifting mechanism allows selection of the appropriate gear ratio for efficiency or comfort under the prevailing circumstances. For example, it may be comfortable to use a high gear when cycling downhill, a medium gear when cycling on a flat road, and a low gear when cycling uphill. Different gear ratios and gear ranges are appropriate for different people and styles of cycling.

For a bicycle to travel at the same speed, using a lower gear (larger mechanical advantage) requires the rider to pedal at a faster cadence, but with less force. Conversely, a higher gear (smaller mechanical advantage) provides a higher speed for a given cadence, but requires the rider to exert greater force. Different cyclists may have different preferences for cadence and pedaling force. Prolonged exertion of too much force in too high a gear at too low a cadence can increase the chance of knee damage, and cadence above 100 rpm becomes less effective after short bursts.

There are many kinds of gearing system for bicycles, and most of them are using sprocket with a derailleur and the internal hub gear type.

Sprocket with a derailleur is a kind of manual gear shifting system. Derailleur is used for shifting the chain attachment onto sprockets of different sizes for gaining gear ratios. The gear ratio depends on the ratio of the number of teeth on the chain ring to the number of teeth on the rear sprocket. A cyclist can attach the chain onto sprockets of bigger size for lower gears, while attaching the chain onto sprockets of smaller size for higher gears. A steel wire is connected between the derailleur and the shifters. The cyclist can tension the wire for shifting gear to higher gears, while release the wire for shifting gear to lower gears.

For bicycles equipped with hub gears, the gear ratio also depends on the internal planetary gears within the hub. For a shaft-driven bicycle, the gear ratio depends on the bevel gears used at each end of the shaft. For shifting the gear, a steel wire is connected to the shaft and the shifter. Tensioning and releasing the wire for shifting the shaft outward and inward that different ratio can be obtained by attaching the shaft gear to planetary gears of different sizes.

For shifting gears, both methods require certain amount of force on tensioning and releasing the wire. Selecting an appropriate gear for riding is also troublesome for junior and senior rider. While riding, hard force may be exerted on the pedal. It tensions the chain and makes the gear shifting difficult. If no pedaling the chain is stuck on the sprocket, and no matter how the cyclist pushes the shifter, the gears cannot be changed without pedaling. That means the easiest way to shift gears is to keep a nice pedaling while the bike is moving forward.

It is the only function the conventional gearing system does.

SUMMARY

In an aspect, there is provided a bicycle gearing system including:

(a) an input shaft defining an axis of rotation and having an outer end provided with a sprocket and an inner end provided with an inner sun gear, which meshes with a ring gear via a plurality of internal planet gears and a plurality of external planet gears carried by a planet carrier;

(b) an output shaft connected with the ring gear;

(c) a hollow sun shaft sleeved over the input shaft, the sun shaft having an outer end engaged with a first clutch disk and an inner end provided with an outer sun gear, which meshes with the ring gear via the plurality of external planet gears, the outer sun gear disposed on an outer side of the inner sun gear and having a size larger than that of the inner sun gear;

(d) an outer clutch presser plate being used to clutch the first clutch disk on a clutch base so as to synchronize rotation of the outer sun gear and the clutch base;

(e) a middle clutch presser plate being used to clutch a second clutch disk on the planet carrier so as to synchronize rotation of the planet carrier and the clutch base;

(f) an inner clutch presser plate being used to clutch the clutch base on a clutch housing directly so as to stop the clutch base from rotating;

(g) a camshaft rotatable about its axis by a motor, the camshaft comprising axially spaced inner, middle and outer cam disks formed with axially protruding inner, middle and outer wedge portions respectively oriented at different angles around the camshaft; the inner, middle and outer wedge portions being selectively engageable with inner, middle and outer cam follower plates formed on circumferences of the inner, middle and outer clutch presser plates respectively; and (h) a plurality of steels balls being statically placed within a plurality of spherical cavities formed between each clutch presser plate and the clutch housing such that when the inner, middle and outer clutch presser plates rotate, the inner, middle and outer clutch presser plates are forced to move axially away from the clutch housing along the axis of rotation due to shearing force of the steel balls between the clutch presser plates and the clutch housing for frictional engagement with the clutch base, the second clutch disk and the first clutch disk respectively;

(i) when the camshaft is rotated through a first angle of rotation to a first position, the wedge portions of the inner and outer cam disks press on the inner and outer cam follower plates, and rotate the inner and outer clutch presser plates which are forced to move axially by the steel balls so that the clutch base and the first clutch disk, which clutches between the clutch base and the sun shaft, are frictionally engaged respectively, and all of the planet gears rotate without revolution with the planet carrier, thereby setting a first gear with a first gear ratio that provides the output shaft with a lowest speed but a highest torque of rotation;

(j) when the camshaft is further rotated through a second angle of rotation to a second position, the wedge portions of the inner and middle cam disks press on the inner and middle cam follower plates, and rotate the inner and middle clutch presser plates which are forced to move axially by the steel balls so that the clutch base and the second clutch disk, which clutches between the clutch base and the planet carrier, are frictionally engaged respectively, and all of the planet gears rotate with revolution of the planet carrier, thereby setting a second gear with a second gear ratio that provides the output shaft with a moderate speed and torque of rotation; and (k) when the camshaft is further rotated through a third angle of rotation to a third position, the wedge portions of the middle and outer cam disks press on the middle and outer cam follower plates, and rotate the middle and outer clutch presser plates which are forced to move axially by the steel balls so that the first clutch disk and the second clutch disk are frictionally engaged respectively, and the input shaft and the output shaft rotate synchronously, and all of the planet gears stop to rotate and revolve with the planet carrier, thereby setting a third gear with a third gear ratio that provides the output shaft with a same speed and torque of rotation.

In another aspect, there is provided a bicycle gearing system including:

(a) an input shaft defining an axis of rotation and having an outer end provided with a sprocket and an inner end provided with an inner sun gear, which meshes with a ring gear via a plurality of internal planet gears and a plurality of external planet gears carried by a planet carrier;

(b) an output shaft connected with the ring gear;

(c) a hollow sun shaft sleeved over the input shaft, the sun shaft having an outer end engaged with a first clutch disk and an inner end provided with an outer sun gear, which meshes with the ring gear via the plurality of external planet gears, the outer sun gear disposed on an outer side of the inner sun gear and having a size larger than that of the inner sun gear;

(d) an outer clutch presser plate being used to clutch the first clutch disk on a clutch base so as to synchronize rotation of the outer sun gear and the clutch base;

(e) a middle clutch presser plate being used to clutch a second clutch disk on the planet carrier so as to synchronize rotation of the planet carrier and the clutch base;

(f) an inner clutch presser plate being used to clutch the clutch base on a clutch housing directly so as to stop the clutch base from rotating; and (g) a camshaft rotatable about its axis by a motor, the camshaft comprising inner, middle and outer cams selectively engageable with inner, middle and outer cam followers formed on the inner, middle and outer clutch presser plates respectively; such that the inner, middle and outer clutch presser plates are forced to move axially along the axis of rotation for frictional engagement with the clutch base, the second clutch disk and the first clutch disk respectively;

(h) whereby different angles of rotation of the camshaft produce different clutch and gear combinations, and hence different gear ratios.

The inner, middle and outer cams may be in the form of axially spaced inner, middle and outer cam disks formed on the cam shaft, and may be formed with circumferentially and axially protruding inner, middle and outer wedge portions respectively oriented at different angles around the camshaft; the inner, middle and outer wedge portions being selectively engageable with the inner, middle and outer cam followers, which are in the form of inner, middle and outer cam follower plates, formed on circumferences of the inner, middle and outer clutch presser plates respectively.

A plurality of steels balls may be statically placed within a plurality of spherical cavities formed between each clutch presser plate and the clutch housing such that when the inner, middle and outer clutch presser plates rotate, the inner, middle and outer clutch presser plates are forced to move axially away from the clutch housing along the axis of rotation due to shearing force of the steel balls between the clutch presser plates and the clutch housing for frictional engagement with the clutch base, the second clutch disk and the first clutch disk respectively.

In an embodiment, when the camshaft is rotated through a first angle of rotation to a first position, the wedge portions of the inner and outer cam disks press on the inner and outer cam follower plates, and rotate the inner and outer clutch presser plates which are forced to move axially by the steel balls so that the clutch base and the first clutch disk, which clutches between the clutch base and the sun shaft, are frictionally engaged respectively, and all of the planet gears rotate without revolution with the planet carrier, thereby setting a first gear with a first gear ratio that provides the output shaft with a lowest speed but a highest torque of rotation.

In an embodiment, wherein when the camshaft is further rotated through a second angle of rotation to a second position, the wedge portions of the inner and middle cam disks press on the inner and middle cam follower plates, and rotate the inner and middle clutch presser plates which are forced to move axially by the steel balls so that the clutch base and the second clutch disk, which clutches between the clutch base and the planet carrier, are frictionally engaged respectively, and all of the planet gears rotate with revolution of the planet carrier, thereby setting a second gear with a second gear ratio that provides the output shaft with a moderate speed and torque of rotation.

In an embodiment, when the camshaft is further rotated through a third angle of rotation to a third position, the wedge portions of the middle and outer cam disks press on the middle and outer cam follower plates, and rotate the middle and outer clutch presser plates which are forced to move axially by the steel balls so that the first clutch disk and the second clutch disk are frictionally engaged respectively, and the input shaft and the output shaft rotate synchronously, and all of the planet gears stop to rotate and revolve with the planet carrier, thereby setting a third gear with a third gear ratio that provides the output shaft with a same speed and torque of rotation.

The first clutch disk may be annular in shape and may be formed along an inner circumference thereof with a plurality of teeth engageable with a plurality of mating notches provided on the sun shaft.

The second clutch disk may be annular in shape and may be formed along an outer circumference thereof with a plurality of teeth engageable with a plurality of mating notches provided on the clutch base.

Each clutch disk may have a frictional surface.

The camshaft may pass through an opening formed on each cam follower plate.

The camshaft may be oriented in a direction tangent to the inner clutch presser plate.

The motor may be mounted in the clutch housing in which the clutch disks, the clutch presser plates, and the clutch base are mounted.

Each wedge portion may be in a shape of a spherical wedge.

A gear fixer in the form of a cap formed with screw holes may be provided on an outer side of the sprocket to facilitate fixing of the gearing system on a bicycle frame by screws.

The motor may be connected with a microcontroller unit mounted on a control board provided on a bicycle for automatic gear shifting.

The motor may be connected with a button provided on a bicycle for manual gear shifting.

The motor may be connected with a smart phone for programmable gear shifting.

In the third aspect, there is provided a bicycle including the above gearing system.

The bicycle gearing system of the present application relates to an automatic gearing technology with smart controller for enhancing the gearing system of bicycle. This gearing system allows users to change gear automatically by selecting customized modes by clicking a virtual button on a smart phone or a micro-computer, or pressing a physical button.

It is a concept of "Ride by Air" where a cyclist can control the gears through a wireless remote controller or smart phone anytime at any place. Once the wireless controller or smart phone is connected to the device, the cyclist can control the gear box through those devices. With smart phone or micro-computer connected, the status of the gears can be popped up on a screen. The status, such as current gear ratio, speed, input torque, slope, battery, etc. can be shown on the screen for the cyclist's reference.

Through those statuses shown on the screen, the cyclist can understand and learn more about what they ride and their performance. It helps to keep fit or do training on bicycle in systematic way. All the data can also be downloaded from the cloud server later on.

The design of the gearing system of the present application makes use of easy plug and play installation design. Users can just remove the traditional sprocket system and replace it by the gearing system of the present application, using the same locking screw to fix the gearing system of the present application onto the wheel hub. The installation is easy and can be made by using simple tool.

BRIEF DESCRIPTION OF THE DRAWINGS

Specific embodiments of the bicycle gearing system will now be described by way of example with reference to the accompanying drawings wherein.

DETAILED DESCRIPTION

Reference will now be made in detail to a preferred embodiment of the bicycle gearing system, examples of which are also provided in the following description. Exemplary embodiments of the bicycle gearing system are described in detail, although it will be apparent to those skilled in the relevant art that some features that are not particularly important to an understanding of the bicycle gearing system may not be shown for the sake of clarity.

Furthermore, it should be understood that the bicycle gearing system is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 1:
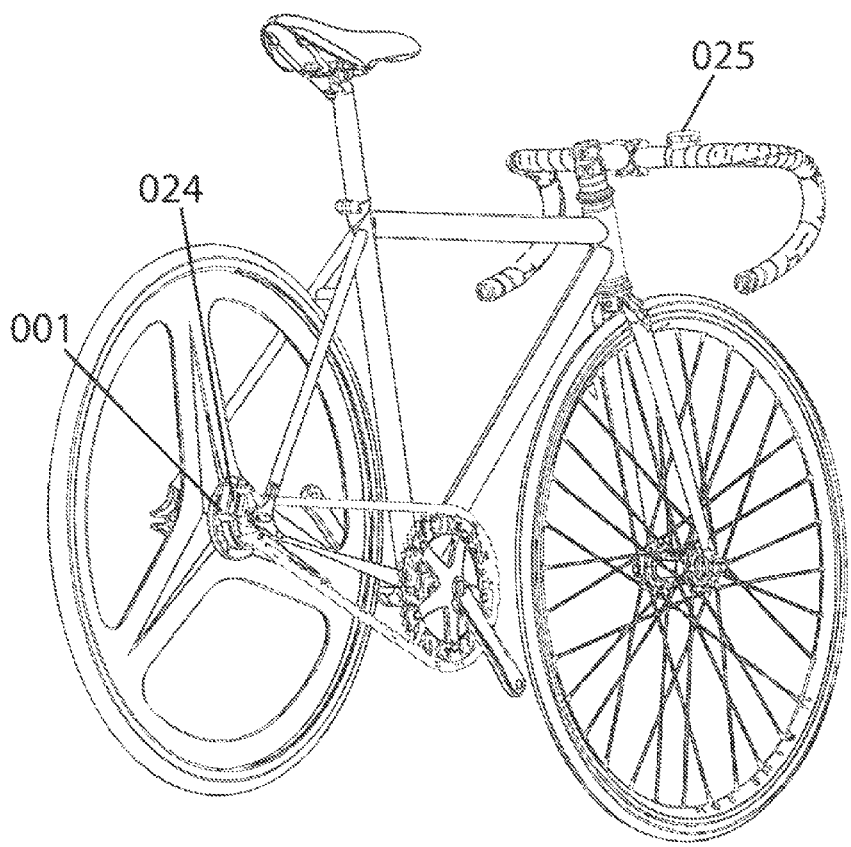
FIG. 001 shows the Smart Gearing System for Bicycle installed on a rear shaft of the bike with the chain attached on it, according to an embodiment of the present application.

FIG. 001 shows the Smart Gearing System for Bicycle installed on a rear shaft of the bike with the chain attached on it, according to an embodiment of the present application. It shows that the Smart Gearing System for Bicycle 001 can fit for installing on bikes by replacing the traditional sprocket.

Smart Gearing System for Bicycle 001 disclosed in the present application is an automatic gearing system for bikes combined with automatic gearing mechanism and the smart IOT concept in a device. This Smart Gearing System for Bicycle 001 can be either used with or without connection to a smart phone. With smart phone connected, advanced functions related to the internet can be used, while only basic functions can be used without smart phone.

Figure 2:
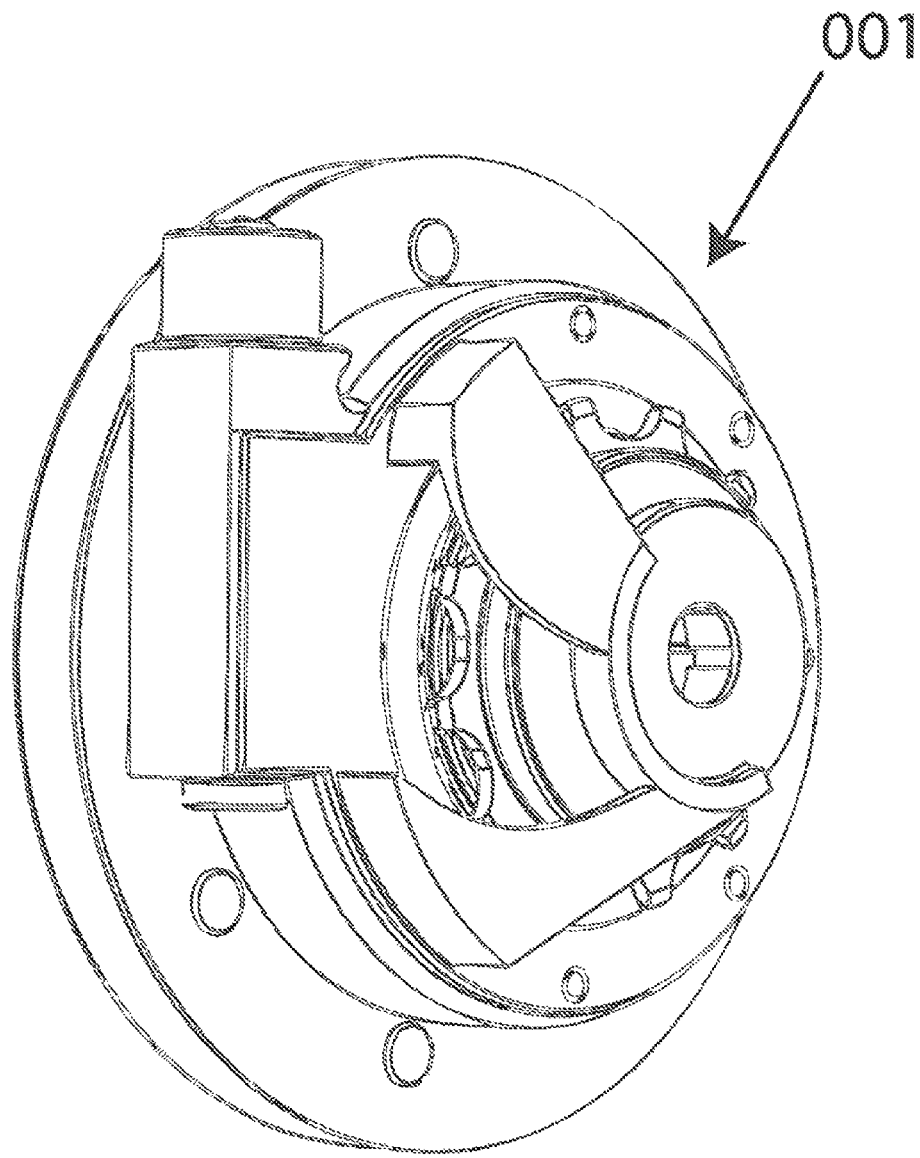
FIG. 002 shows a front perspective view of the Smart Gearing System for Bicycle, according to an embodiment of the present application.

FIG. 002 shows a front perspective view of the Smart Gearing System for Bicycle, according to an embodiment of the present application. It can be installed by aligning the shaft of the hub to a hole of the gearing system of the present application shown in the figure.

Figure 3:
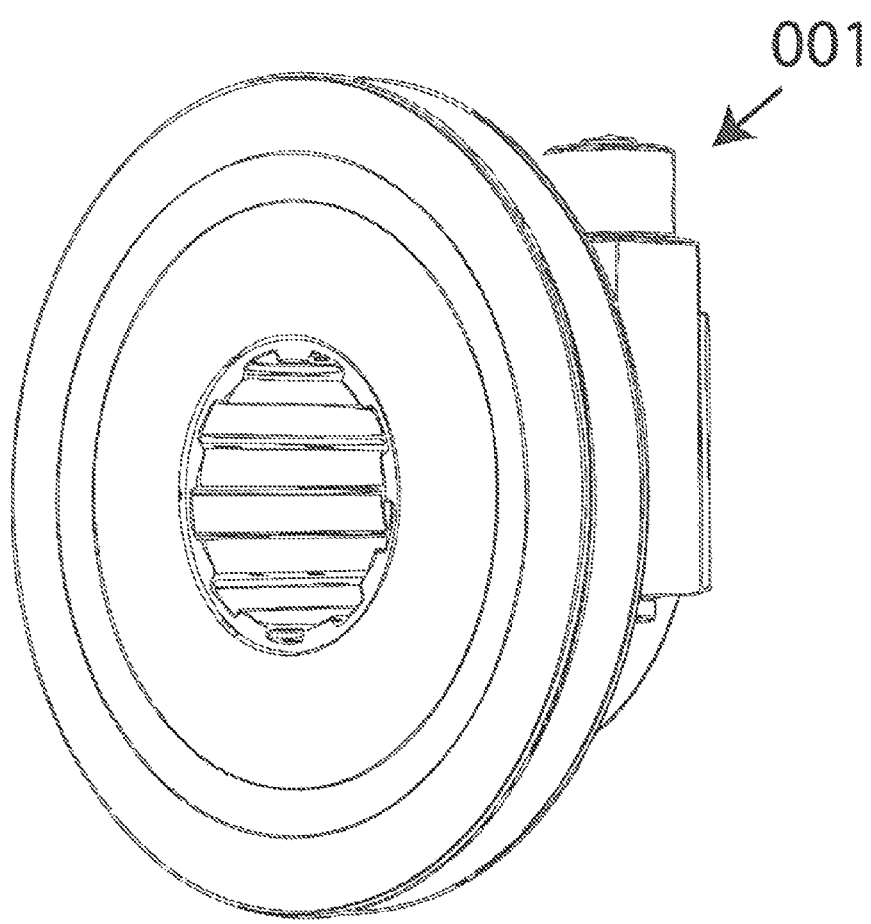
FIG. 003 shows a rear perspective view of the Smart Gearing System for Bicycle, according to an embodiment of the present application.

FIG. 003 shows a rear perspective view of the Smart Gearing System for Bicycle, according to an embodiment of the present application. This figure shows the back side of the gearing system that fits for installing on the wheel hub by aligning with the teeth track.

Figure 4:
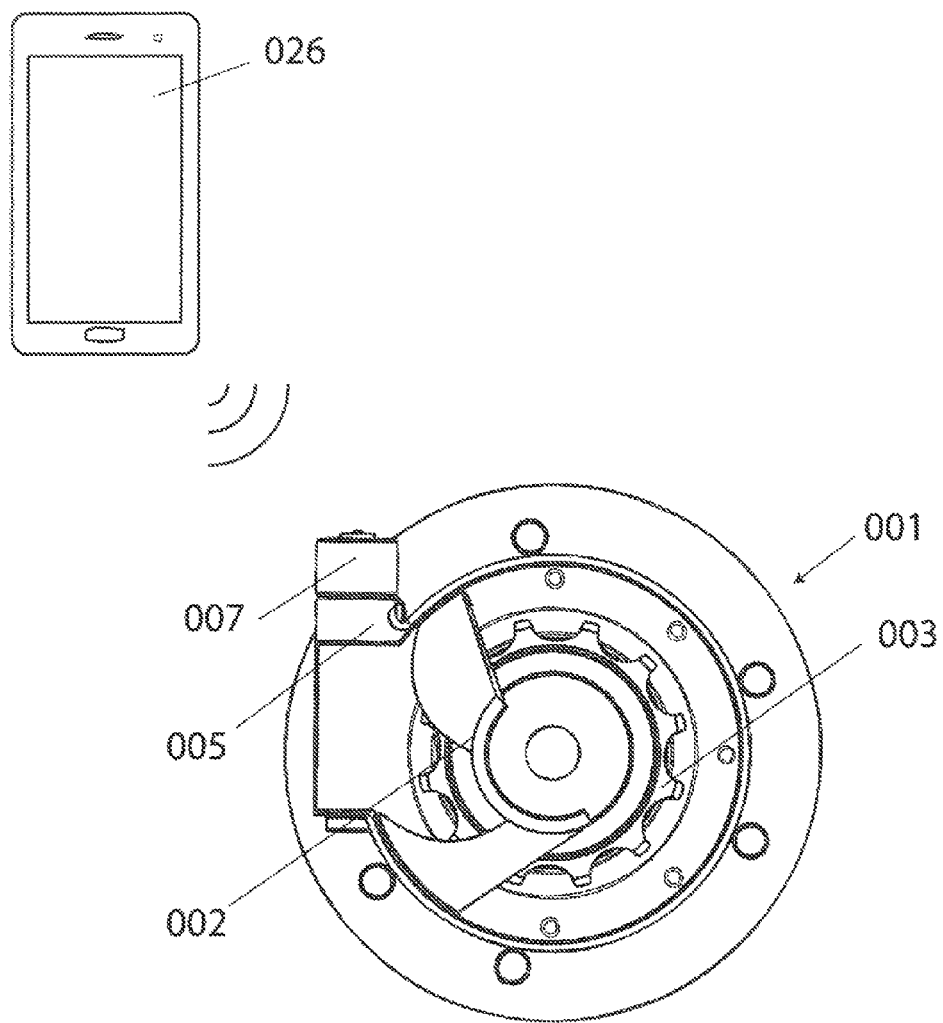
FIG. 004 shows a front view of the Smart Gearing System for Bicycle, according to an embodiment of the present application.

FIG. 004 shows a front view of the Smart Gearing System for Bicycle, according to an embodiment of the present application. Some of the components such as Gear Fixer 002, Input Shaft 003, Clutch Housing 005 and Motor 007 are assembled on the gear system.

Figure 5:
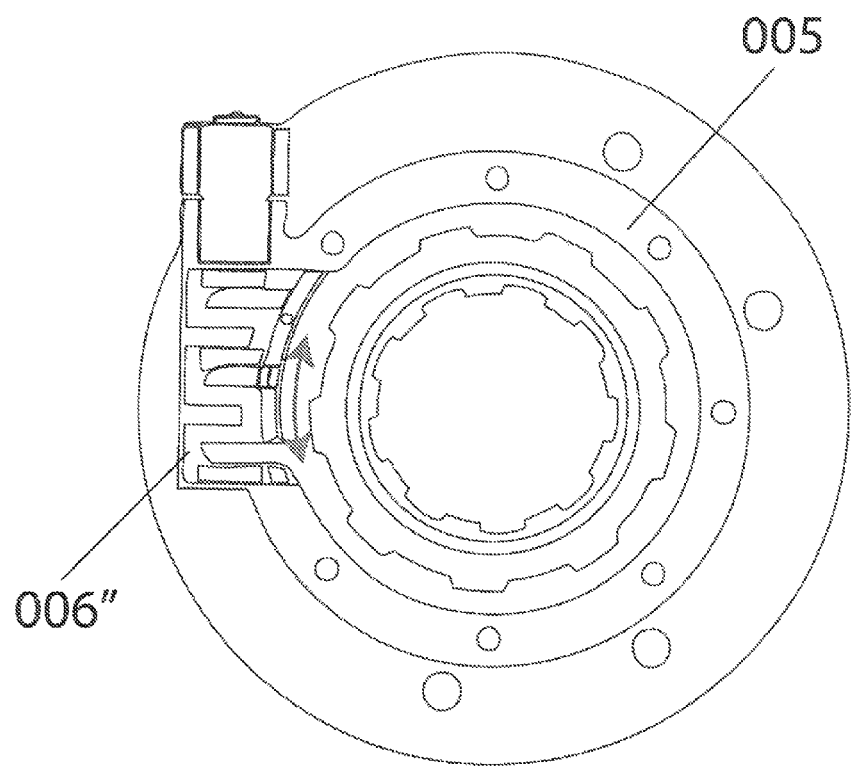
FIG. 005 shows a front view of the Smart Gearing System for Bicycle with Clutch Presser Plates, according to an embodiment of the present application.

FIG. 005 shows a front view of the Smart Gearing System for Bicycle, according to an embodiment of the present application. The figure shows three Clutch Presser Rings provided in the Clutch Housing 005. This figure also points out the rotational direction of the Clutch Presser Rings.

Figure 6:
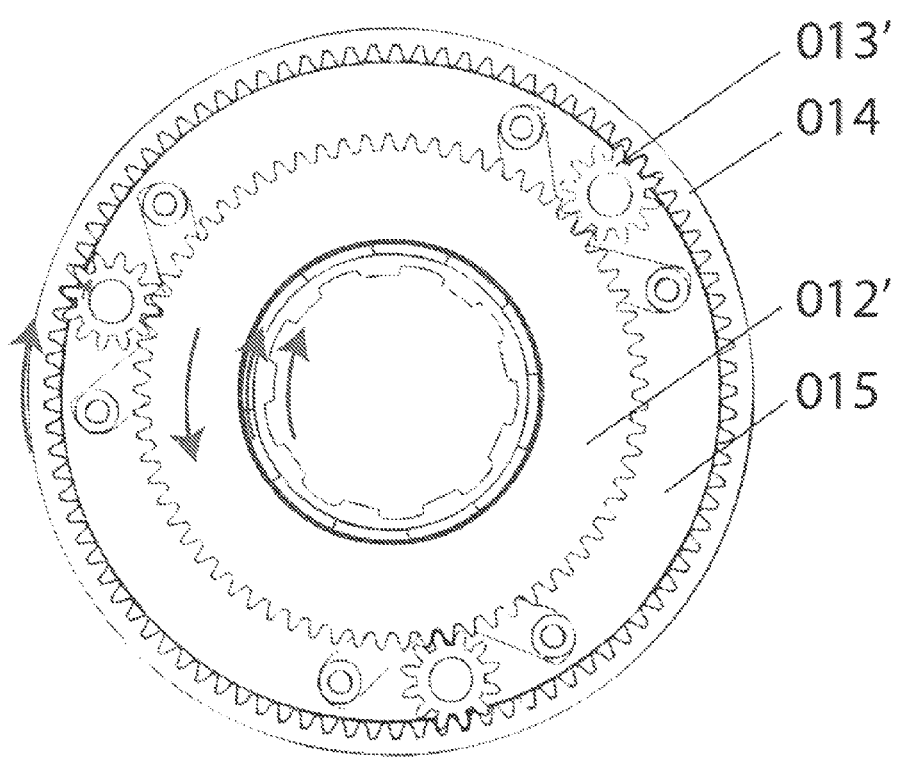
FIG. 006 shows a cross-sectional view of a satellite gear of the Smart Gearing System for Bicycle, according to an embodiment of the present application.

FIG. 006 shows a cross-sectional view of a satellite gear of the Smart Gearing System for Bicycle, according to an embodiment of the present application. The figure shows an outer layer of satellite gear. The rotational directions of a large Sun Gear 012', external Planet Gears 013', Ring Gear 014, and Output Shaft 015 are pointed out in the figure.

Figure 7:
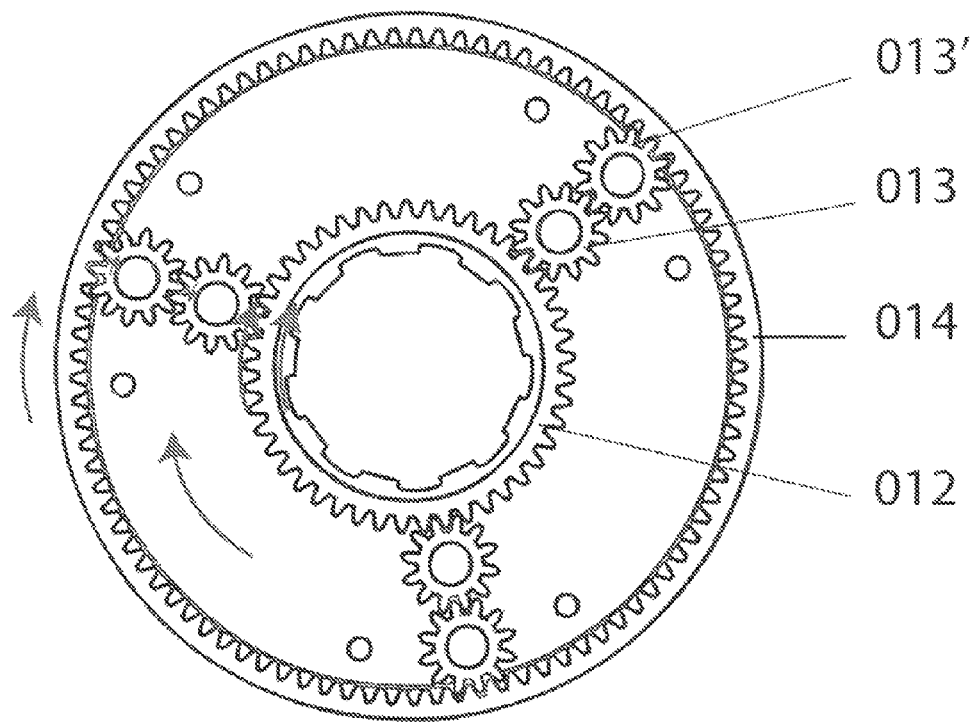
FIG. 007 shows a cross-sectional view of another satellite gear of the Smart Gearing System for Bicycle, according to an embodiment of the present application.

FIG. 007 shows a cross-sectional view of another satellite gear of the Smart Gearing System for Bicycle, according to an embodiment of the present application. The figure shows an inner layer of satellite gear. The rotational directions of small Sun Gear 012, internal Planet Gears 013, external Planet Gears 013', and Ring Gear 014 are pointed out in the figure.

Figure 10:
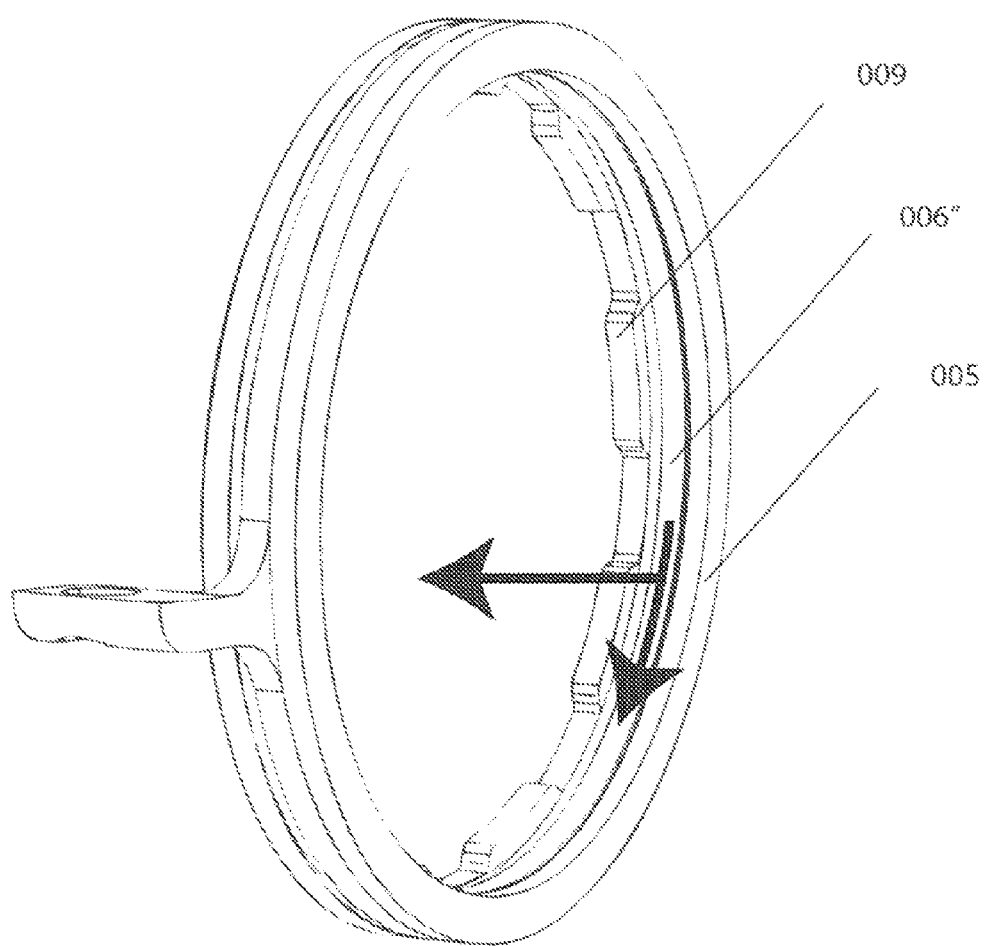
FIGS. 010 and 010a show the clutch mechanism, according to an embodiment of the present application.
Figure 10A:
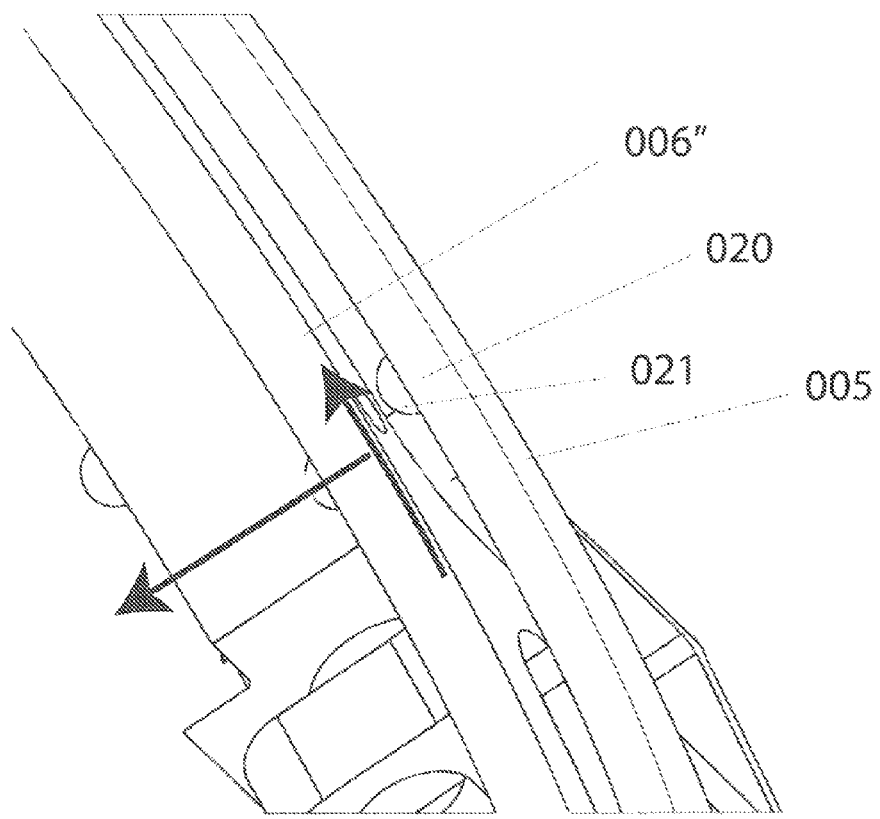
Figure 11:
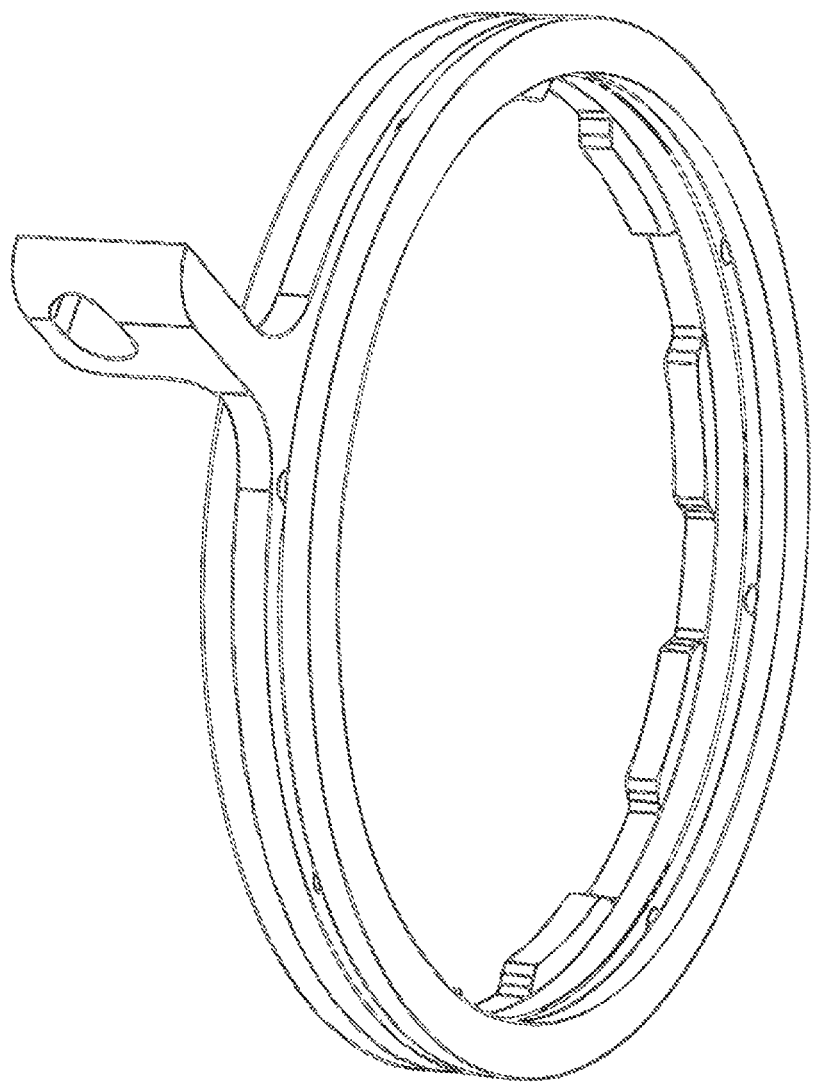
FIG. 011 shows the Clutch Presser Ring pressing on the Clutch Disk, according to an embodiment of the present application.

FIGS. 008, 009, 009a and 009b show different views of the Smart Gearing System for Bicycle according to an embodiment of the present application. This is the part of the clutch that contributes the gears shifting mechanism of the gearing system. Motor 007 and a PCB control board 024 can be placed inside the Clutch Housing 005. FIGS. 010, 010a and 11 show the clutching mechanism according to an embodiment of the present application. The three Clutch Presser Plates 006, 006', 006" are engageable with Clutch Housing 005, and the first and second Clutch Disks 009, 010.

Figure 8:
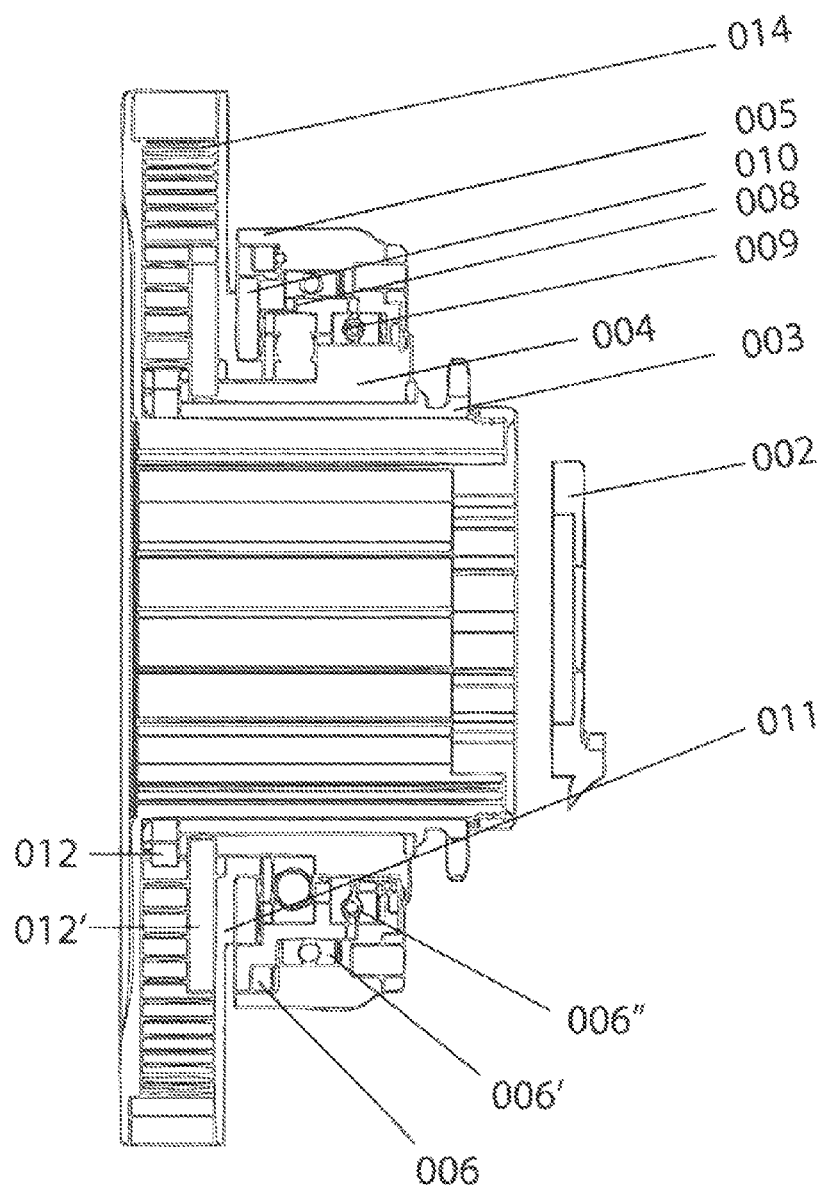
FIG. 008 shows a cross-sectional view of the Smart Gearing System for Bicycle, according to an embodiment of the present application.

As depicted in FIG. 008, the bicycle gearing system may include input shaft 003 which defines an axis of rotation x. The input shaft 003 may have an outer end provided with a sprocket and an inner end provided with a small inner sun gear 012, which may mesh with ring gear 014 via a plurality of internal planet gears 013 and a plurality of external planet gears 013', which may be carried by a planet carrier 011. An output shaft 015 may be connected with the ring gear 014.

A hollow sun shaft 004 may sleeve over the input shaft 003. The sun shaft 004 may have an outer end engaged with a first clutch disk 009 and an inner end provided with a large outer sun gear 012', which may mesh with the ring gear 014 via the plurality of external planet gears 013'. The large outer sun gear 012' may be disposed on an outer side of the small inner sun gear 012.

An outer clutch presser plate 006" may be used to clutch the first clutch disk 009 on a clutch base 008 so as to synchronize rotation of the large outer sun gear 012' and the clutch base 008.

A middle clutch presser plate 006' may be used to clutch a second clutch disk 010 on the planet carrier 011 so as to synchronize rotation of the planet carrier 011 and the clutch base 008.

An inner clutch presser plate 006 may be used to clutch the clutch base 008 on a clutch housing 005 directly so as to stop the clutch base 008 from rotating.

Figure 9:
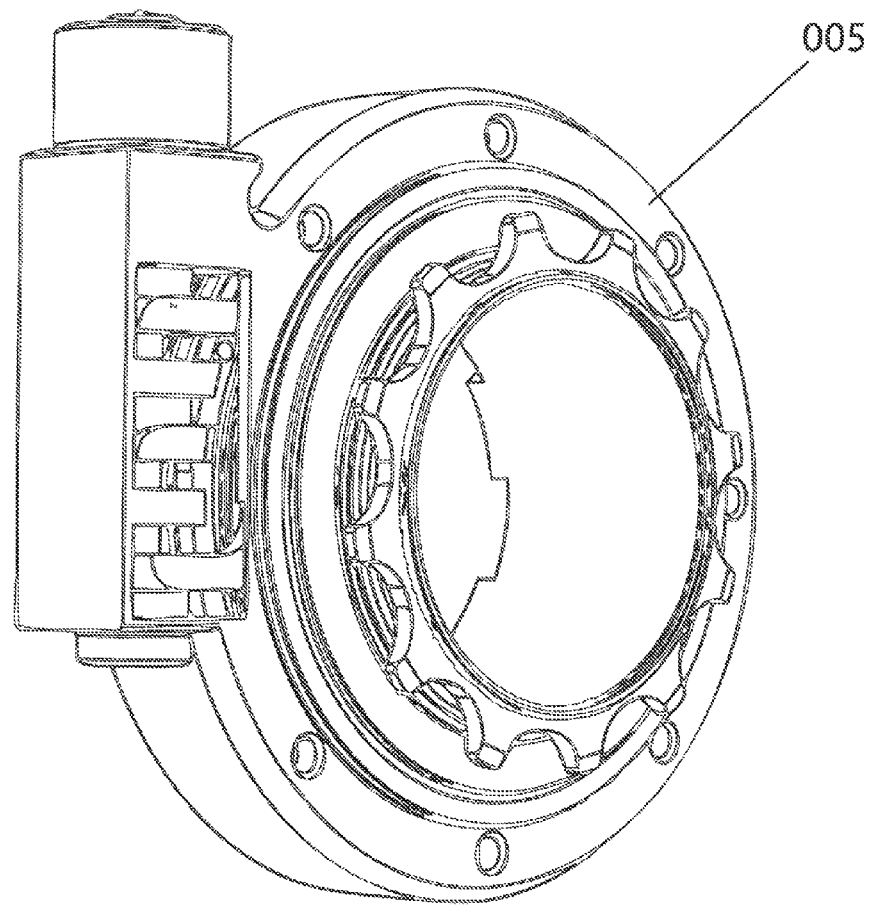
FIGS. 009, 009a and 009b are perspective views of the Clutch Housing and cam mechanism, according to an embodiment of the present application.
Figure 9A:
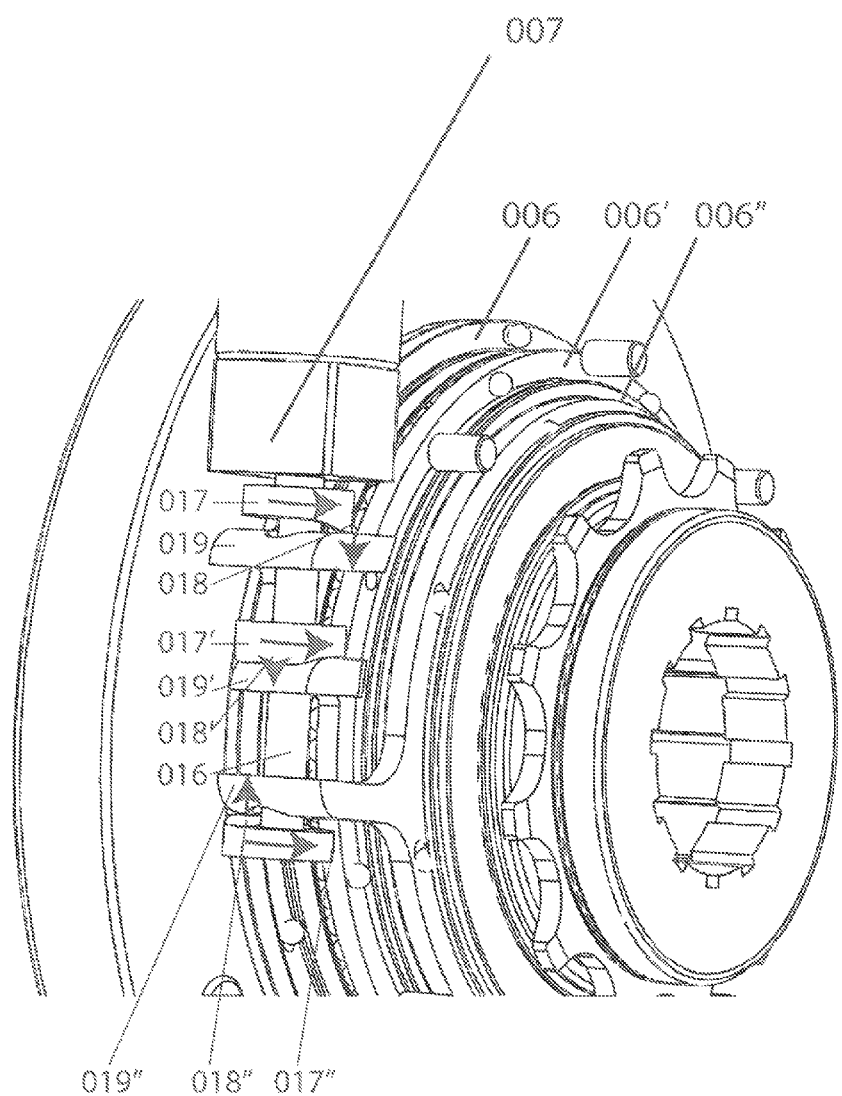
Figure 9B:
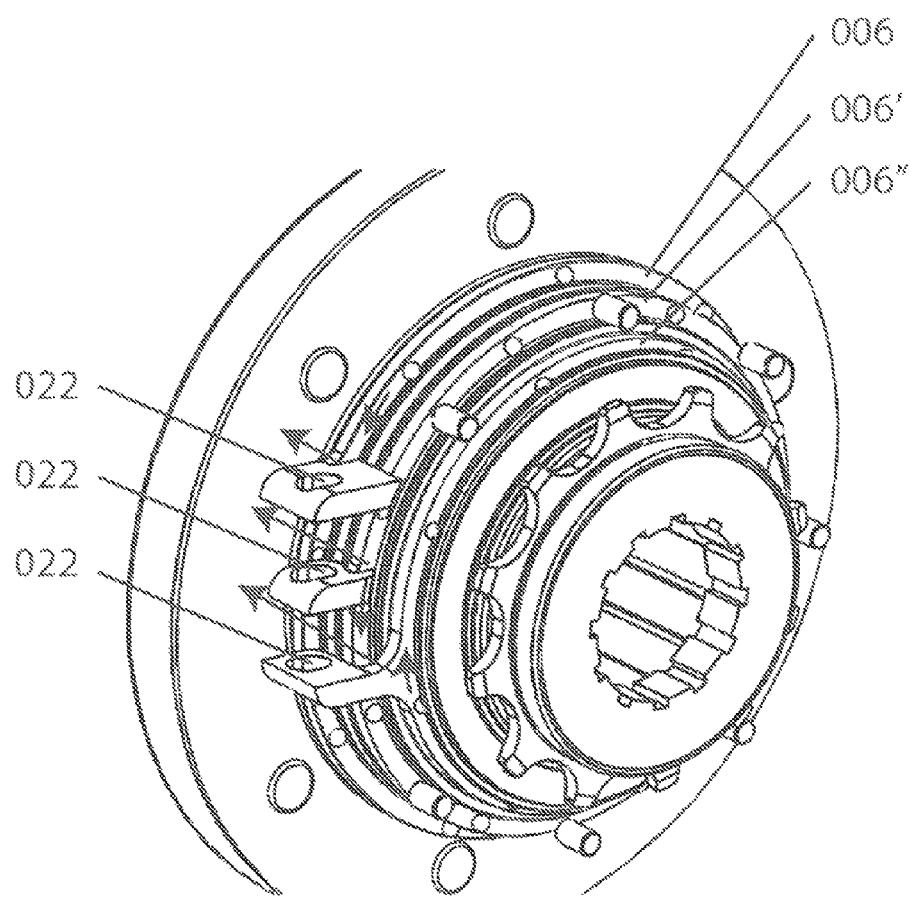

As best illustrated in FIG. 009a, the gearing system may include a camshaft 016 which can be rotatable clockwise or anti-clockwise about its axis by a motor 007. The camshaft 016 may include axially spaced inner, middle and outer cam disks 017, 107', 017" formed with circumferentially and axially protruding inner, middle and outer wedge portions 018, 018', 018" oriented at different angles around the camshaft 016. The inner, middle and outer wedge portions 018, 018', 018" may be selectively engageable with inner, middle and outer cam follower plates 019, 019', 019" formed on the circumferences of the inner, middle and outer clutch presser plates 006, 006', 006" respectively.

The camshaft 016 may pass through an opening 022 formed on each cam follower plate 019, 019', 019". The camshaft 016 may be oriented in a direction tangent to the inner clutch presser plate 006.

Each wedge portion 018, 018', 018" may be in a shape of a spherical wedge having a thickness increasing circumferentially and axially along a quarter of the cam disk 017, 017', 017" and decreasing circumferentially and axially along a following quarter of the cam disk 017, 017', 017".

As shown in FIG. 010a, a plurality of steels balls 020 may be statically placed within a plurality of spherical cavities 021 formed between each clutch presser plate 006, 006', 006" and the clutch housing 005 such that when the inner, middle and outer clutch presser plates 006, 006', 006" rotate, the inner, middle and outer clutch presser plates 006, 006', 006" can be driven to move axially away from the clutch housing 008 along the axis of rotation x due to the shearing force between the steel balls 020, the clutch presser plates 006, 006', 006" and the clutch housing 005. The shearing force is the force that converts rotation of the Clutching Presser Plates to a linear force that is used for frictional engagement with the Clutch Base 008, the first Clutch Disk 009 and the second Clutch Disk 010.

Figure 12:
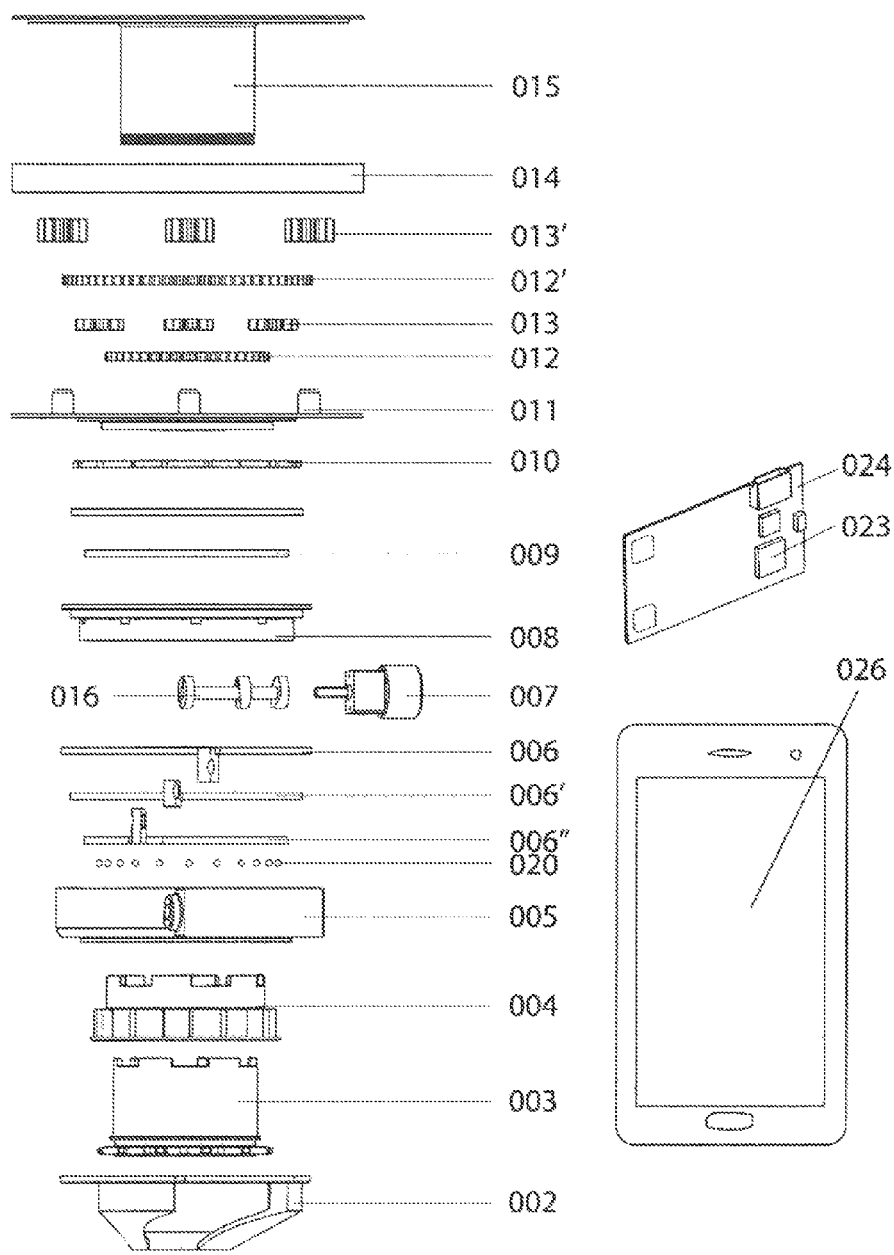
FIG. 012 shows a disassembled view of the parts of the Smart Gearing System for Bicycle, according to an embodiment of the present application.
Figure 13:
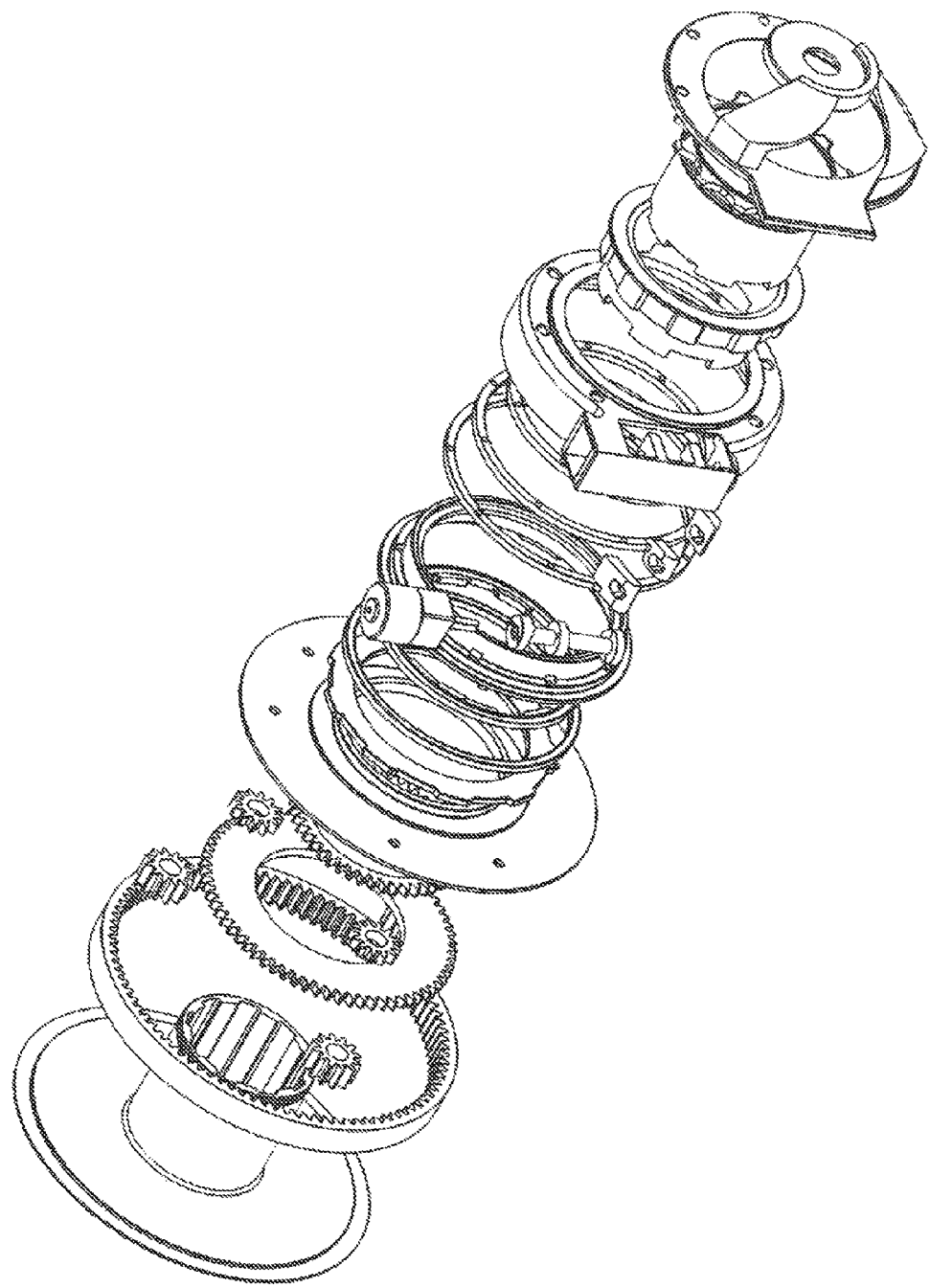
FIG. 013 shows a front exploded view of the parts of the Smart Gearing System for Bicycle, according to an embodiment of the present application.
Figure 14:
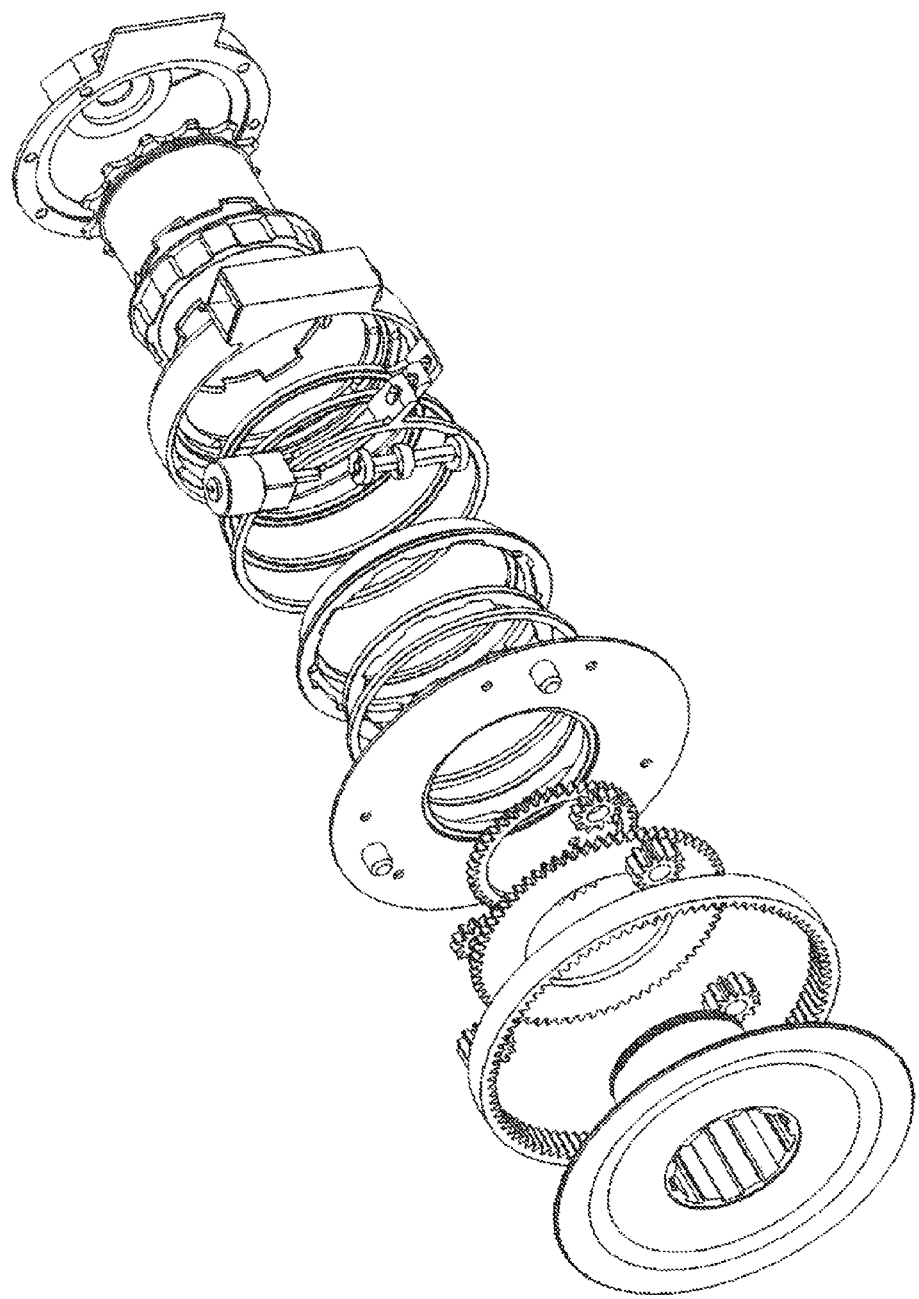
FIG. 014 shows a rear exploded view of the parts of the Smart Gearing System for Bicycle, according to an embodiment of the present application.

FIG. 012 shows a disassembled view of the parts of the Smart Gearing System for Bicycle, according to an embodiment of the present application. FIG. 013 shows a front exploded view of the parts of the Smart Gearing System for Bicycle, according to an embodiment of the present application. FIG. 014 shows a rear exploded view of the parts of the Smart Gearing System for Bicycle, according to an embodiment of the present application.

Gear Fixer 002 may be used to hold the gearing system and prevent itself from rotating by locking the system onto a bicycle frame. It can be also used for covering the bicycle chain as a chain guide that prevents loosening of the chain. It may be in the form of a cap formed with screw holes to facilitate fixing of the gearing system on the bicycle frame by conventional screw means.

Input Shaft 003 is a shaft designed with a sprocket provided at an outer end, and an inner end may be provided with the small Sun Gear 012, which may be at the inner position connected with the inner Planet Gears 013. Driving force is transmitted from a bicycle chain through the sprocket. The gained rotational force drives the small Sun Gear 012 and the satellite system to work so that input force is magnified and transmitted to the output shaft through the gear ratio established in the satellite system.

Sun Shaft 004 may be another shaft with one end connected to the large Sun Gear 012 for interacting with outer Planet Gears 013' while the other end geared with the first Clutch Disk 009 for gear shifting. One combination, including a shaft connected with a sun gear, a clutch disk and a clutch presser plate, can contribute a level of gear shifting. A 2-gear system requires two sets of the combination, a 3-gear system requires three sets of combination, and a multiple-gear system requires more sets of the combination. The present gearing system has three gear levels. Therefore, three combinations of it are required.

Clutch Housing 005 may be the housing for holding all the clutch mechanism inside. It may be held by the Gear Fixer 002 that may be fixed on the bicycle frame. It provides reaction force to the clutch mechanism for gear shifting.

Clutch Presser Plates 006, 006', 006" are presser plates that provide pressing force to Clutch Disks 009, 010 so that frictional force built up on the Clutch Disks. Once friction in between is high enough, synchronization of rotation can be achieved by the clutching effect.

The outer Clutch Presser Plate 006" can be used to clutch the first Clutch Disk 009 on the Clutch Base 008 so as to synchronize the rotation of the large Sun Gear 012' and Clutch Base 008.

The inner Clutch Presser Plate 006 can be used to clutch the Clutch Base 008 on the Clutch Hosing 005 directly to stop it from rotating.

The middle Clutch Presser Plate 006' can be used to clutch the second Clutch Disk 010 on the Planet Carrier 011 so as to synchronize rotation of the Planet Carrier 011 and the Clutch Base 008.

Motor 007 can be any kind of motor such as step motor, servo or DC motor. It provides electromagnetic driving force for the gear shifting mechanism. It can be controlled by a programmed MCU which may be built-in on a control board. With relevant data such as speed, and slope connected, the MCU can determine the appropriate gear ratio and trigger the motor to rotate at a certain degree in order to obtain the desired clutch mechanism.

Clutch Base 008 may be a rotor that acts like a bridge to connect with the Clutch Housing 005, Sun Shaft 004 and Planet Carrier 011 through three Clutch Presser Plates 006, 006', 006" and two Clutch Disks 009 and 010. The inner Clutch Presser Plate 006 directly presses on the Clutch Base 008 to stop it from rotating while the other two (i.e. the middle Clutch Presser Plate 006' and outer Clutch Presser Plate 006") are through the two Clutch Disks 009, 010.

First Clutch Disk 009 may be annular in shape and may be formed along an inner circumference thereof with a plurality of teeth engageable with a plurality of mating notches provided on the Sun Shaft 004 for providing clutching effect for the large Sun Gear 012. It may be a disk like plate with frictional material, such as ceramic, formed on the surface. Once pressing force, which may be provided from the outer Clutch Presser Plate 006", applies on it, frictional force increases and synchronizes its rotation with the Clutch Base 008. If the Clutch Base 008 is stopped by the inner Clutch Presser Plate 006, and gear 1 is in control.

Second Clutch Disk 010 may be annular in shape and may be formed along an outer circumference thereof with a plurality of teeth engageable with a plurality of mating notches provided on the Clutch Base 008 for providing clutching effect for the Planet Carrier 011. It may be a disk like plate with frictional material, such as ceramic, formed on the surface. Once pressing force, which may be provided from the middle Clutch Presser Plate 006', applies on it, frictional force increases and synchronizes its rotation with the Clutch Base 008. Whether the Clutch Base 008 rotates or stops, the Planet Carrier 011 follows the rotation of the Clutch Base 008.

Therefore, with the second Clutch Disk 010 clutched, the first Clutch Disk 009 is released and the inner Clutch Presser Plate 006 is actuated to stop the Clutch Base 008 from rotating, and gear 2 is in control.

If the second Clutch Disk 010 and the first Clutch Disk 009 are clutched at the same time with the inner Clutch Presser Plate 006 released, both clutch disks rotate at the same speed and synchronize the rotation between Planet Gear 013 and large Sun Gear 012, and gear 3 is in control.

Planet Holder 011 may be used for holding Planet Gear 013 so that they rotate along a predetermined track. It may be one of the parts in the satellite gearing system for magnifying the input torque. It provides a track for planet gears rotating not only locally but also globally for different gear ratio contributions. Rotating globally contributes larger gear ratio.

Sun Gears 012, 012' are the components in the satellite gearing system for inputting or inducting power with gearing ratio. In the system, there are two sun gears, namely a large sun gear 012' and a small sun gear 012. The large sun gear 012' may be attached on the Sun Shaft 004 for power induction while the small sun gear 012 may be attached on the Input Shaft 003 for power input.

Planet Gears 013, 013' may be gears positioned between the sun gear 012, 012' and the ring gear 014. Size difference of their combination contributes different gear ratios. It may be one of the major components of the satellite gearing system.

Ring Gear 014 may be the ring gear of the satellite gearing system that can provide reaction from the wheel so that the input driving force can be transmitted to the wheel through the force acting on it. It may be fixed on the Output Shaft 015.

Output Shaft 015 may be the shaft that transmits driven rotational force to the wheel. It connects to the Ring Gear 014 for gaining force and equipped with housing for attaching to the wheel hub.

Operation

When the motor 007 is actuated and the camshaft 016 is rotated through a first angle of rotation to a first position, the wedge portions 018, 018" of the inner and outer cam disks 017, 017" press on the inner and outer cam follower plates 019, 019", and rotate the inner and outer clutch presser plates 006, 006" which are forced to move axially by the steel balls 020 so that the clutch base 008 and the first clutch disk 009, which clutches between the clutch base 008 and the sun shaft 004, are frictionally engaged respectively. Then, all of the planet gears 13, 13' rotate without revolution with the planet carrier 011, thereby setting a first gear with a first gear ratio that provides the output shaft 015 with a lowest speed but a highest torque of rotation.

When the motor 007 is actuated and the camshaft 016 is further rotated through a second angle of rotation to a second position, the wedge portions 018, 018' of the inner and middle cam disks 017, 017' press on the inner and middle cam follower plates 019, 019', and rotate the inner and middle clutch presser plates 006, 006' which are forced to move axially by the steel balls 020 so that the clutch base 008 and the second clutch disk 010, which clutches between the clutch base 008 and the planet carrier 011, are frictionally engaged respectively. Then, all of the planet gears 013, 013' rotate with revolution of the planet carrier 011, thereby setting a second gear with a second gear ratio that provides the output shaft 015 with a moderate speed and torque of rotation.

When the motor 007 is actuated and the camshaft 016 is further rotated through a third angle of rotation to a third position, the wedge portions 018', 018" of the middle and outer cam disks 017', 017" press on the middle and outer cam follower plates 019', 019", and rotate the middle and outer clutch presser plates 006', 006" which are forced to move axially by the steel balls 020 so that the first clutch disk 009 and the second clutch disk 010 are frictionally engaged respectively, and the input shaft 003 and the output shaft 015 rotate synchronously. Then, all of the planet gears 013, 013' stop to rotate and revolve with the planet carrier

011, thereby setting a third gear with a third gear ratio that provides the output shaft 015 with a same speed and torque of rotation.

To shift back to second gear or first gear, Motor 007 is actuated to rotate the camshaft in an opposite direction so that previous stage of the gearing level can be achieved as mentioned above.

The bicycle gearing system of the present application can make use of a satellite gearing system as the core with different combination of gears size for obtaining different gear ratio for riding. The bicycle gearing system can be divided into three parts, namely, a controller, a clutch system, and a satellite gearing system.

For the control box, it may be equipped with sensors such as rotational speed sensor, torque sensor, position sensor, etc. for collecting running data from the bike. Using Bluetooth BLE or WiFi data can be transmitted to smart phone or micro-computer for calculation and analysis. After calculation is made, control signal can be sent back to the system control board for actuating the Motor 007 connected. The control signal can trigger the motor to rotate at certain degree that desired clutch mechanism is made. The degree of the motor rotates depends on the gear ratio to be selected.

The clutch system of the bicycle gearing system may include a plurality of Clutch Presser Rings 006, Clutch Disks 9, 10, and a Clutch Base 008. The Clutch Housing 005 may be the cover for these parts providing reaction force to the Clutch Presser Rings 006 for contributing pressing force. Once a Clutch Presser Ring 006 rotates certain degree, pressing force generated and pushing forward to a relevant Clutch Disk 9, 10 shown in FIGS. 009 and 010. As the friction built up on the Clutch Disk 9, 10, the rotational speed of parts in between synchronized each other. Shifting gear mechanism is some kinds of releasing and pressing mechanism of the clutch disk for selecting desired combination of gears pair that chosen by the program logic. The clutch disk 9, 10 to be pressed may be the gear to be selected.

Satellite gears are sets of gears combination magnify the input torque to the desired output torque. It makes use of sun gears 012, 012', planet gears 013, 013', and ring gear 014 for contributing different gear ratios. The more combinations of gears are provided, the more gear ratios can be obtained. Different sizes of gears contribute different gear ratios. FIG. 007 is an example of a combination of gears that contributes gear ratios in the satellite gearing system.

Figure 15:
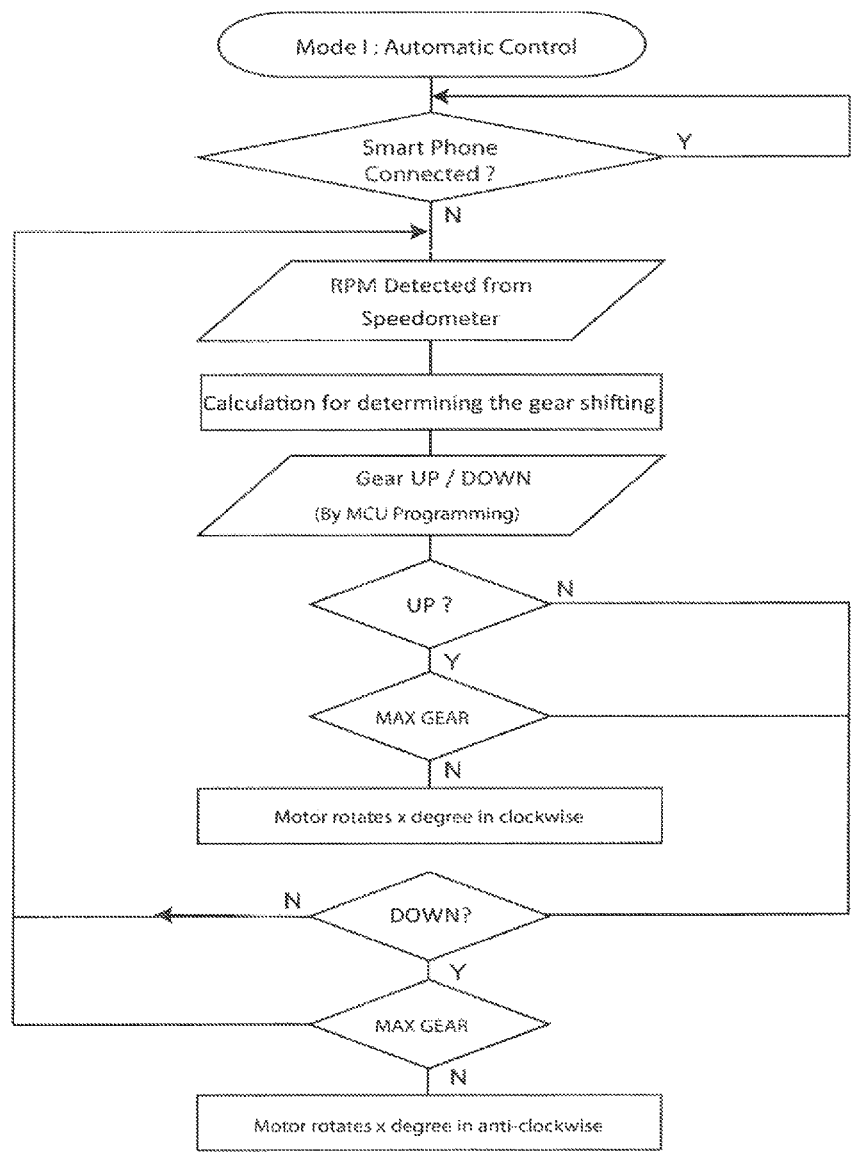
FIGS. 015-017 show three control selections of the Smart Gearing System for Bicycle, according to an embodiment of the present application.
Figure 16:
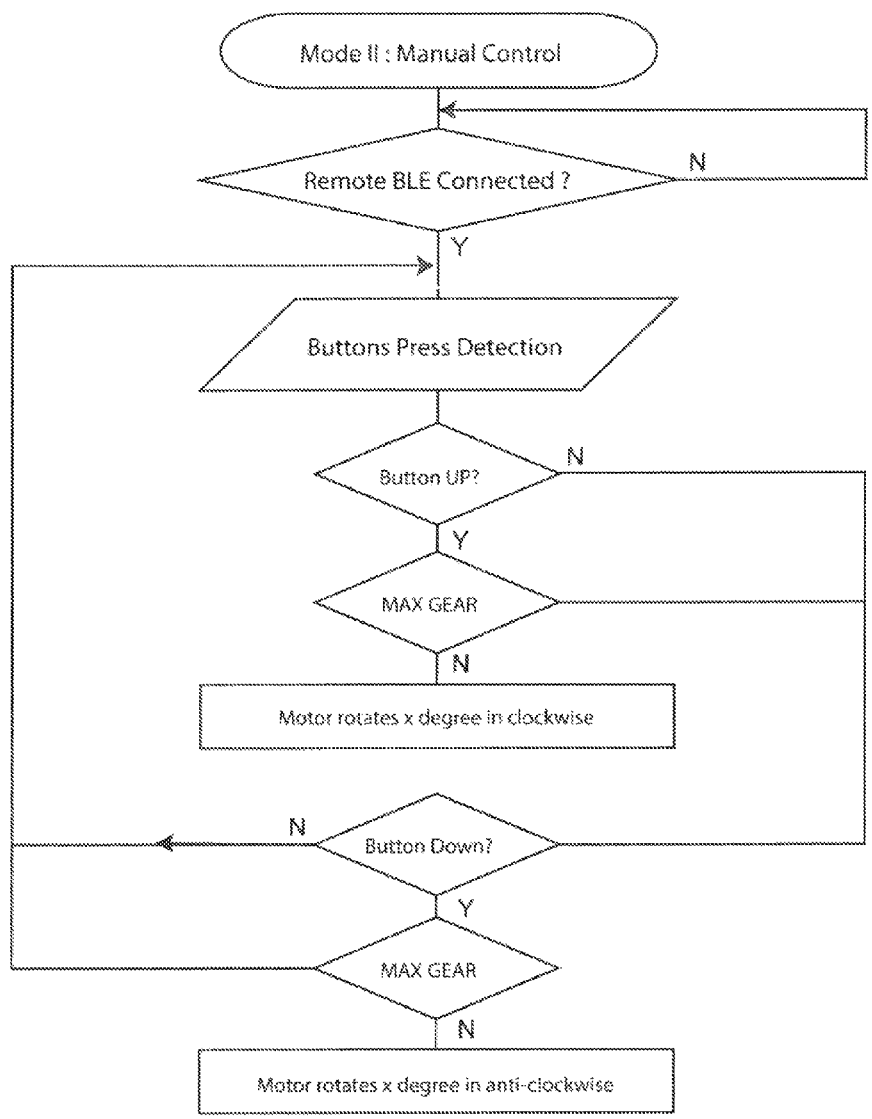
Figure 17:
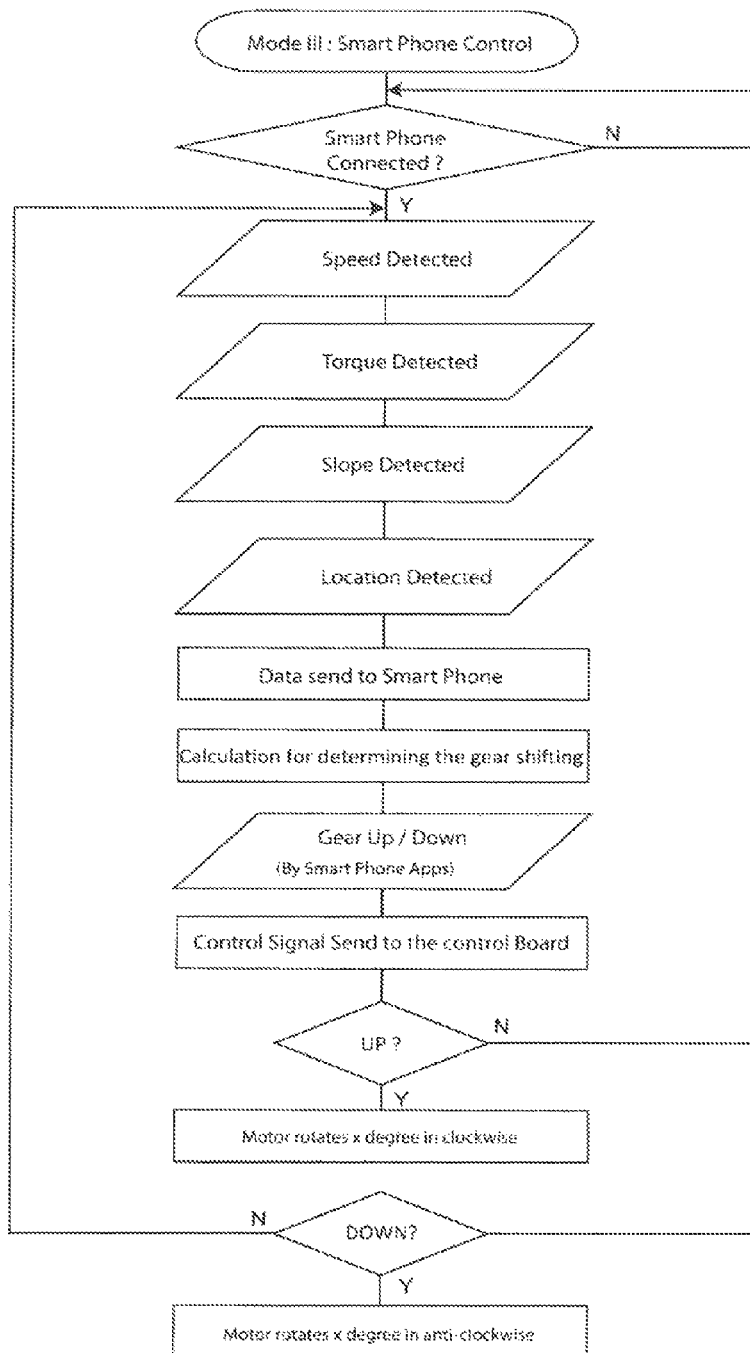

Referring to FIGS. 015-017, a multiple of control selections are provided. Users can select anyone that fits for their habit or purpose.

Automatic Control, sensors built-in on the control board can sense peripheral data, such as input torque, slope, speed and so on, for calculation. Program preset on the microcontroller 023 installed on the control board 024 can calculate and analyze data, and find out the appropriate gear ratio for riding for the user. A control signal can be sent to a motor driver for actuating the motor to rotate to the desired degree for shifting gear ratio. By continuously checking the variation of the collected data, relevant gear ratio can be shifted appropriately.

Manual Control may be a mode provided for users with an optional function on shifting gears manually. Users can freely choose the gear ratio they preferred by only a simple click of a virtual button on the app or a physical button 0025 provided. Through the manual control, users can shift the gears manually based on analyzing the road situation by their own mind, and can fully handle the gear box by themselves.

Smart Phone Control, similar to the automatic control, sensors built-in on the control board can sense peripheral data, such as input torque, slope, speed and so on, for calculation. With connection to the smart phone 0026 or micro-computer, program preset on the app can calculate and analyze data, and find out the appropriate gear ratio for riding for the user. A control signal can be sent to a control board for actuating the motor to rotate to the desired angle for shifting gear ratio. By continuously checking the variation of the collected data, relevant gear ratio can be shifted appropriately. With power calculation ability and interact access, not only auto and manual mode can be selected but also some kinds of comfort mode, sport modes etc. can be selected. It makes use of powerful data calculation for running complicated programming, and tailored gearing character can be made for different cyclists with different riding habits. By accessing interact through smart phone or micro-computer, all the settings can be recorded to the cloud server and downloaded them later for fun or training.

The bicycle gearing system of the present application provides a multi-functional smart gearing system for bicycle riding mechanism. The gearing system may be configured to be installed on the rear wheel hub which may be same position as the traditional sprocket gears. Two power sources can be used. One is the lithium rechargeable battery, while another may be the generator installed on a bicycle. Green power can be used for the operation as the motor and control board only consume small amount of power during operation. Therefore using generator on bike can continuously use the gearing system of the present application without charging. It can function as both automatic and manual gearing. Furthermore, with the assistance of smart phone or micro-computer, customized gear shifting habit can also be set as comfort or sport mode that can fulfill different users' need. All riding data, including speed, input power, gearing ratio etc., can be transmitted to the cloud server for the use as internet of thing.

While the bicycle gearing system has been shown and described with particular references to a number of preferred embodiments thereof, it should be noted that various other changes or modifications may be made without departing from the scope of the appended claims.

What is claimed is:

1. A bicycle gearing system comprising:
(a) an input shaft defining an axis of rotation and having an outer end provided with a sprocket and an inner end provided with an inner sun gear, wherein the inner sun gear meshes with a ring gear via a plurality of internal planet gears and a plurality of external planet gears carried by a planet carrier;
(b) an output shaft connected with the ring gear;
(c) a hollow sun shaft sleeved over the input shaft, the sun shaft having an outer end engaged with a first clutch disk and an inner end provided with an outer sun gear, wherein the outer sun gear meshes with the ring gear via the plurality of external planet gears, the outer sun gear disposed on an outer side of the inner sun gear and having a size larger than that of the inner sun gear;
(d) an outer clutch presser plate being used to clutch the first clutch disk on a clutch base so as to synchronize rotation of the outer sun gear and the clutch base;
(e) a middle clutch presser plate being used to clutch a second clutch disk on the planet carrier so as to synchronize rotation of the planet carrier and the clutch base;

(f) an inner clutch presser plate being used to clutch the clutch base on a clutch housing directly so as to stop the clutch base from rotating;

(g) a camshaft rotatable about its axis by a motor, the camshaft comprising axially spaced inner, middle and outer cam disks formed with axially protruding inner, middle and outer wedge portions respectively oriented at different angles around the camshaft; the inner, middle and outer wedge portions being selectively engageable with inner, middle and outer cam follower plates formed on circumferences of the inner, middle and outer clutch presser plates respectively; and (h) a plurality of steel balls being statically placed within a plurality of spherical cavities formed between each clutch presser plate and the clutch housing such that when the inner, middle and outer clutch presser plates rotate, the inner, middle and outer clutch presser plates are forced to move axially away from the clutch housing along the axis of rotation due to shearing force of the steel balls between the clutch presser plates and the clutch housing for frictional engagement with the clutch base, the second clutch disk and the first clutch disk respectively;

(i) when the camshaft is rotated through a first angle of rotation to a first position, the wedge portions of the inner and outer cam disks press on the inner and outer cam follower plates, and rotate the inner and outer clutch presser plates which are forced to move axially by the steel balls so that the clutch base, and the first clutch disk clutching between the clutch base and the sun shaft, are frictionally engaged respectively, and all of the planet gears rotate without revolution with the planet carrier, thereby setting a first gear with a first gear ratio that provides the output shaft with a lowest speed but a highest torque of rotation;

(j) when the camshaft is fluffier rotated through a second angle of rotation to a second position, the wedge portions of the inner and middle cam disks press on the inner and middle cam follower plates, and rotate the inner and middle clutch presser plates which are forced to move axially by the steel balls so that the clutch base and the second clutch disk, which clutches between the clutch base and the planet carrier, are frictionally engaged respectively, and all of the planet gears rotate with revolution of the planet carrier, thereby setting a second gear with a second gear ratio that provides the output shaft with a moderate speed and torque of rotation; and (k) when the camshaft is further rotated through a third angle of rotation to a third position, the wedge portions of the middle and outer cam disks press on the middle and outer cam follower plates, and rotate the middle and outer clutch presser plates which are forced to move axially by the steel balls so that the first clutch disk and the second clutch disk are frictionally engaged respectively, and the input shaft and the output shaft rotate synchronously, and all of the planet gears stop to rotate and revolve with the planet carrier, thereby setting a third gear with a third gear ratio that provides the output shaft with a same speed and torque of rotation.

2. A bicycle gearing system comprising:

(a) an input shaft defining an axis of rotation and having an outer end provided with a sprocket and an inner end provided with an inner sun gear, wherein the sun gear meshes with a ring gear via a plurality of internal planet gears and a plurality of external planet gears carried by a planet carrier;

(b) an output shaft connected with the ring gear;

(c) a hollow sun shaft sleeved over the input shaft, the sun shaft having an outer end engaged with a first clutch disk and an inner end provided with an outer sun gear, wherein the outer sun gear meshes with the ring gear via the plurality of external planet gears, the outer sun gear disposed on an outer side of the inner sun gear and having a size larger than that of the inner sun gear;

(d) an outer clutch presser plate being used to clutch the first clutch disk on a clutch base so as to synchronize rotation of the outer sun gear and the clutch base;

(e) a middle clutch presser plate being used to clutch a second clutch disk on the planet carrier so as to synchronize rotation of the planet carrier and the clutch base;

(f) an inner clutch presser plate being used to clutch the clutch base on a clutch housing directly so as to stop the clutch base from rotating; and (g) a camshaft rotatable about its axis by a motor, the camshaft comprising inner, middle and outer cams selectively engageable with inner, middle and outer cam followers formed on the inner, middle and outer clutch presser plates respectively; such that the inner, middle and outer clutch presser plates are forced to move axially along the axis of rotation for frictional engagement with the clutch base, the second clutch disk and the first clutch disk respectively;

(h) whereby different angles of rotation of the camshaft produce different clutch and gear combinations, and hence different gear ratios.

3. The bicycle gearing system as claimed in claim 2, wherein the inner, middle and outer cams are in the form of axially spaced inner, middle and outer cam disks formed on the cam shaft, and are formed with circumferentially and axially protruding inner, middle and outer wedge portions respectively oriented at different angles around the camshaft; the inner, middle and outer wedge portions being selectively engageable with the inner, middle and outer cam followers, which are in the form of inner, middle and outer cam follower plates, formed on circumferences of the inner, middle and outer clutch presser plates respectively.

4. The bicycle gearing system as claimed in claim 3, wherein a plurality of steel balls is statically placed within a plurality of spherical cavities formed between each clutch presser plate and the clutch housing such that when the inner, middle and outer clutch presser plates rotate, the inner, middle and outer clutch presser plates are forced to move axially away from the clutch housing along the axis of rotation due to shearing force of the steel balls between the clutch presser plates and the clutch housing for frictional engagement with the clutch base, the second clutch disk and the first clutch disk respectively.

5. The bicycle gearing system as claimed in claim 4, wherein when the camshaft is rotated through a first angle of rotation to a first position, the wedge portions of the inner and outer cam disks press on the inner and outer cam follower plates, and rotate the inner and outer clutch presser plates which are forced to move axially by the steel balls so that the clutch base, and the first clutch disk clutching between the clutch base and the sun shaft, are frictionally engaged respectively, and all of the planet gears rotate without revolution with the planet carrier, thereby setting a first gear with a first gear ratio that provides the output shaft with a lowest speed but a highest torque of rotation.

6. The bicycle gearing system as claimed in claim 5, wherein when the camshaft is further rotated through a second angle of rotation to a second position, the wedge portions of the inner and middle cam disks press on the inner and middle cam follower plates, and rotate the inner and middle clutch presser plates which are forced to move axially by the steel balls so that the clutch base and the second clutch disk, which clutches between the clutch base and the planet carrier, are frictionally engaged respectively, and all of the planet gears rotate with revolution of the planet carrier, thereby setting a second gear with a second gear ratio that provides the output shaft with a moderate speed and torque of rotation.

7. The bicycle gearing system as claimed in claim 6, wherein when the camshaft is further rotated through a third angle of rotation to a third position, the wedge portions of the middle and outer cam disks press on the middle and outer cam follower plates, and rotate the middle and outer clutch presser plates which are forced to move axially by the steel balls so that the first clutch disk and the second clutch disk are frictionally engaged respectively, and the input shaft and the output shaft rotate synchronously, and all of the planet gears stop to rotate and revolve with the planet carrier, thereby setting a third gear with a third gear ratio that provides the output shaft with a same speed and torque of rotation.

8. The bicycle gearing system as claimed in claim 4, wherein the camshaft passes through an opening formed on each cam follower plate.

9. The bicycle gearing system as claimed in claim 4, wherein each wedge portion is in a shape of a spherical wedge.

10. The bicycle gearing system as claimed in claim 2, wherein the first clutch disk is annular in shape and is formed along an inner circumference thereof with a plurality of teeth engageable with a plurality of mating notches provided on the sun shaft.

11. The bicycle gearing system as claimed in claim 2, wherein the second clutch disk is annular in shape and is formed along an outer circumference thereof with a plurality of teeth engageable with a plurality of mating notches provided on the clutch base.

12. The bicycle gearing system as claimed in claim 2, wherein each clutch disk has a frictional surface.

13. The bicycle gearing system as claimed in claim 2, wherein the camshaft is oriented in a direction tangent to the inner clutch presser plate.

14. The bicycle gearing system as claimed in claim 2, wherein the motor is mounted in the clutch housing in which the clutch disks, the clutch presser plates, and the clutch base are mounted.

15. The bicycle gearing system as claimed in claim 2, wherein a gear fixer in the form of a cap formed with screw holes is provided on an outer side of the sprocket to facilitate fixing of the gearing system on a bicycle frame by screws.

16. The bicycle gearing system as claimed in claim 2, wherein the motor is connected with a microcontroller unit mounted on a control board provided on a bicycle for automatic gear shifting.

17. The bicycle gearing system as claimed in claim 2, wherein the motor is connected with a button provided on a bicycle for manual gear shifting.

18. The bicycle gearing system as claimed in claim 2, wherein the motor is connected with a smart phone for programmable gear shifting.

19. A bicycle comprising the gearing system as claimed in claim 2.

* * * * *